US012627789B2

(12) United States Patent
Yasuda et al.

(10) Patent No.: US 12,627,789 B2
(45) Date of Patent: May 12, 2026

(54) INFORMATION PROCESSING DEVICE, INFORMATION PROCESSING METHOD, AND PROGRAM

(71) Applicant: Sony Group Corporation, Tokyo (JP)

(72) Inventors: Ryouhei Yasuda, Tokyo (JP); Yuhei Taki, Kanagawa (JP); Kunihito Sawai, Kanagawa (JP); Shimeng Peng, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/867,824

(22) PCT Filed: May 26, 2023

(86) PCT No.: PCT/JP2023/019671
§ 371 (c)(1),
(2) Date: Nov. 21, 2024

(87) PCT Pub. No.: WO2023/238703
PCT Pub. Date: Dec. 14, 2023

(65) Prior Publication Data
US 2025/0324026 A1 Oct. 16, 2025

(30) Foreign Application Priority Data
Jun. 7, 2022 (JP) ................................. 2022-092460

(51) Int. Cl.
*H04N 13/368* (2018.01)
*G06F 3/01* (2006.01)
*H04N 13/383* (2018.01)

(52) U.S. Cl.
CPC ........... *H04N 13/368* (2018.05); *G06F 3/013* (2013.01); *H04N 13/383* (2018.05)

(58) Field of Classification Search
CPC ........ G06F 3/011; G06F 3/013; G06F 3/0481; G06F 3/1423; G06F 3/04842; G09G 2354/00; H04N 7/15; H04N 13/368; H04N 13/383; H04N 21/4728; H04N 13/117; H04N 21/4316; H04N 21/4758; G06V 40/197; G06V 40/18; G02B 27/0093
See application file for complete search history.

(56) References Cited

U.S. PATENT DOCUMENTS

2015/0220144 A1 8/2015 Ashbrook et al.
2015/0358594 A1* 12/2015 Marshall ................. G06F 3/013
345/419

(Continued)

FOREIGN PATENT DOCUMENTS

JP 2018-077417 A 5/2018
JP 2020-160226 A 10/2020

(Continued)

*Primary Examiner* — Sanjiv D. Patel
(74) *Attorney, Agent, or Firm* — Paratus Law Group, PLLC

(57) ABSTRACT
An information processing device includes a line-of-sight information acquisition unit that acquires line-of-sight information about viewers on a shared screen displayed on a display unit, and a line-of-sight guidance display determination unit that determines whether to display line-of-sight guidance for guiding the lines of sight of the viewers, on the basis of the line-of-sight information about the viewers.

21 Claims, 14 Drawing Sheets

(56) References Cited

U.S. PATENT DOCUMENTS

| | | | | |
|---|---|---|---|---|
| 2016/0360267 | A1* | 12/2016 | Marilly | H04N 21/44008 |
| 2018/0227481 | A1* | 8/2018 | Kimura | H04N 23/63 |
| 2020/0401218 | A1* | 12/2020 | Camilleri | G06F 3/013 |
| 2021/0335085 | A1* | 10/2021 | Froy, Jr. | A63F 13/428 |
| 2024/0220011 | A1* | 7/2024 | Miyazaki | A61B 3/113 |

FOREIGN PATENT DOCUMENTS

| | | | |
|---|---|---|---|
| WO | WO 2013/179426 | A1 | 12/2013 |
| WO | WO 2019/035256 | A1 | 2/2019 |

* cited by examiner

[Fig. 1]
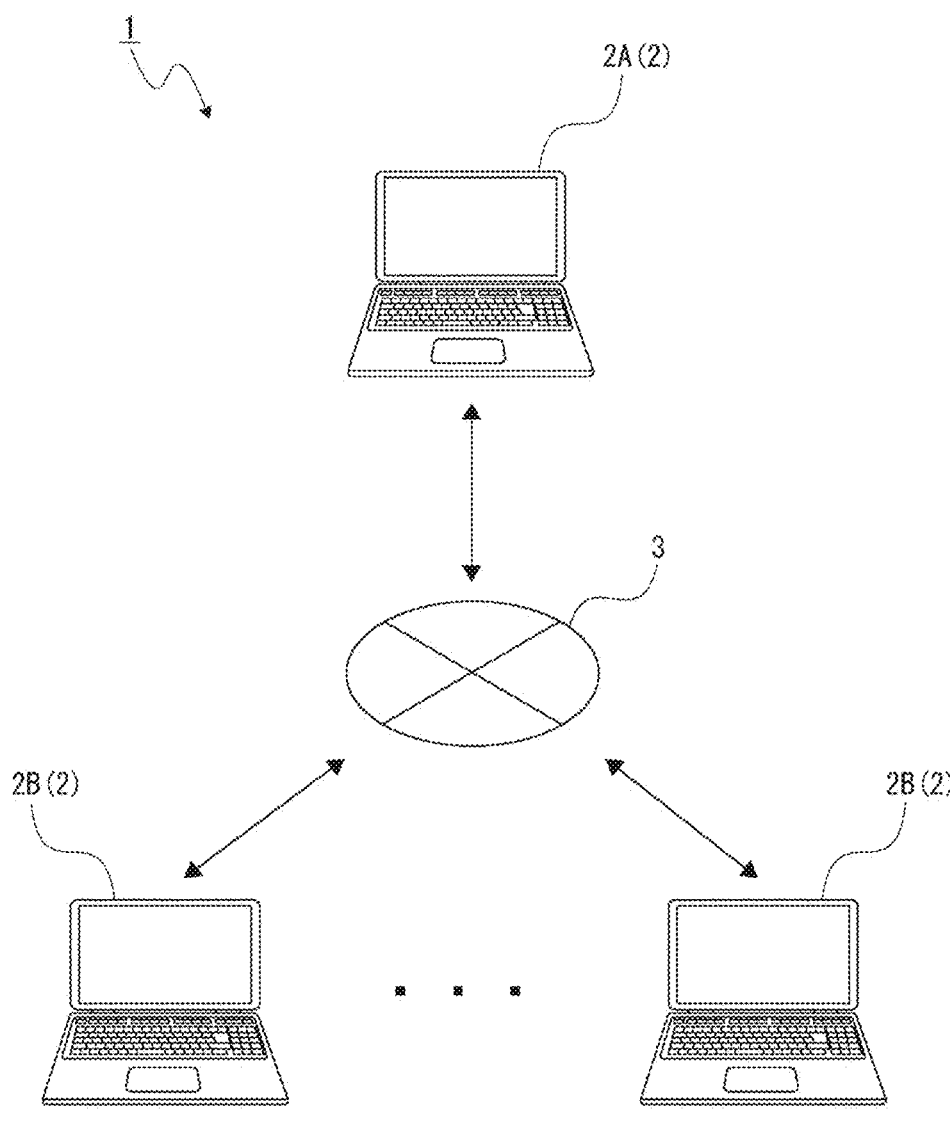

[Fig. 2]
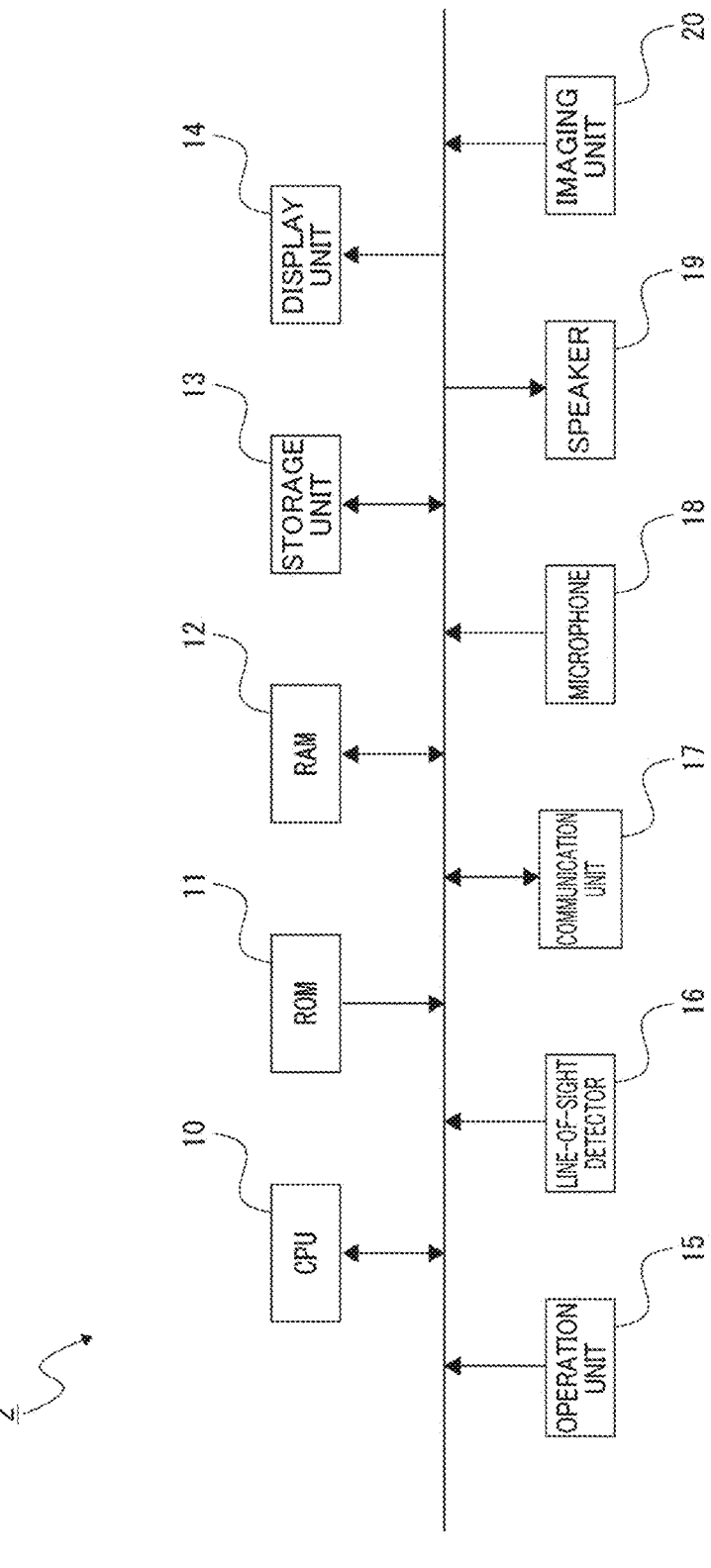

[Fig. 3]
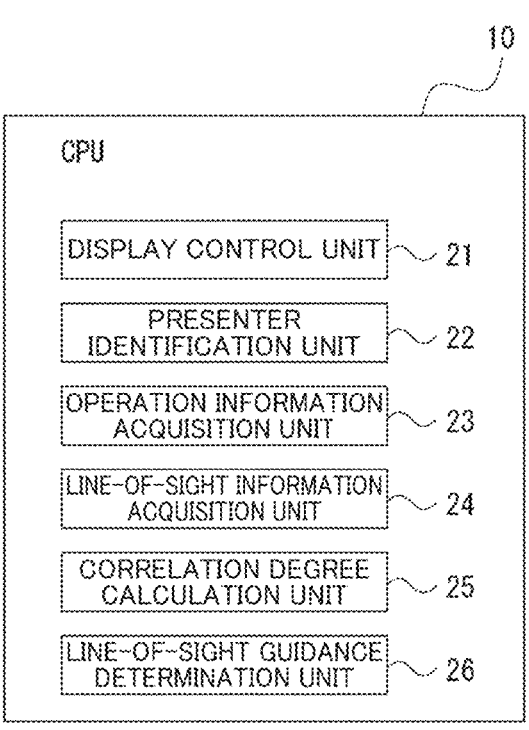

[Fig. 4]
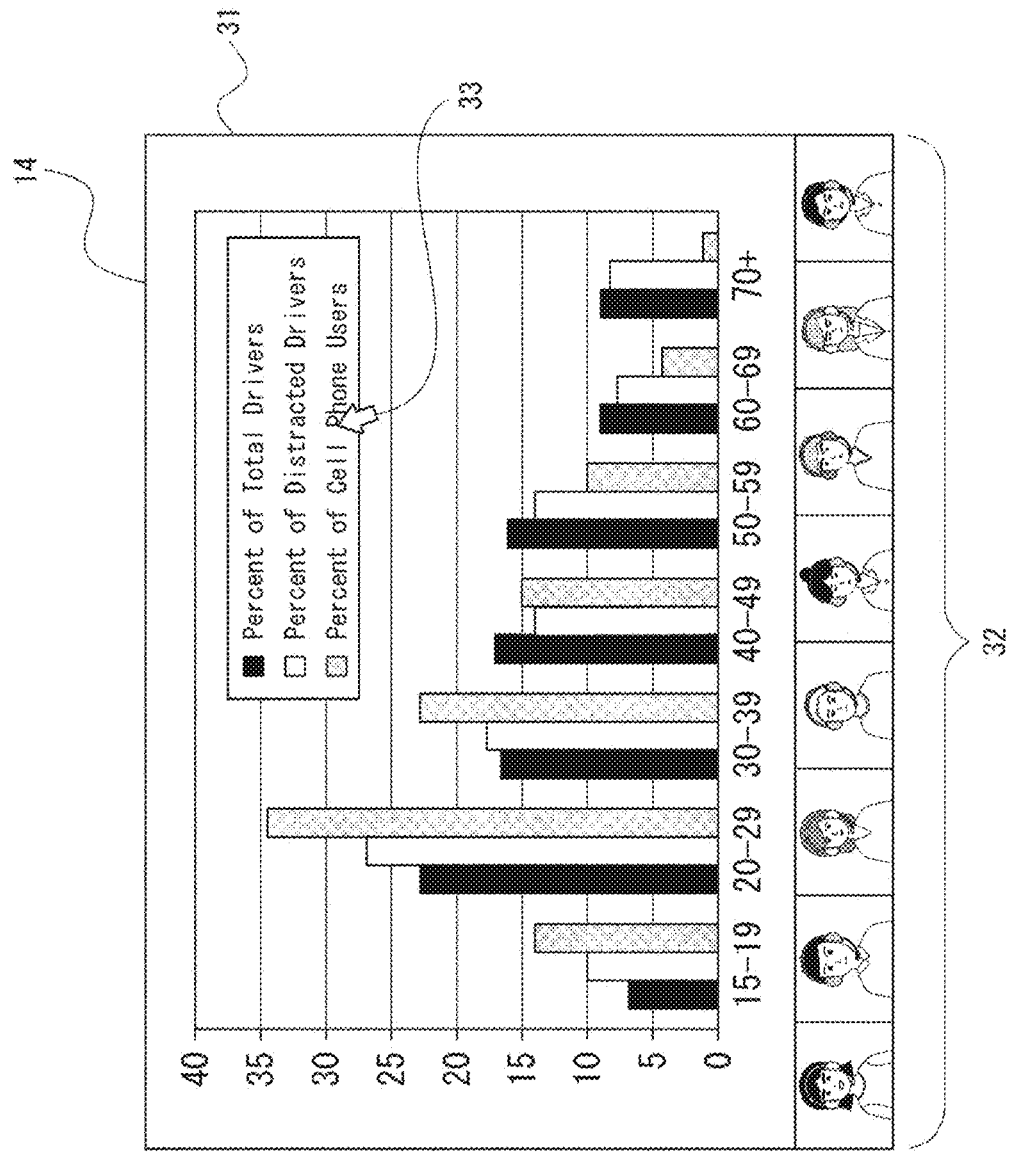

[Fig. 5]
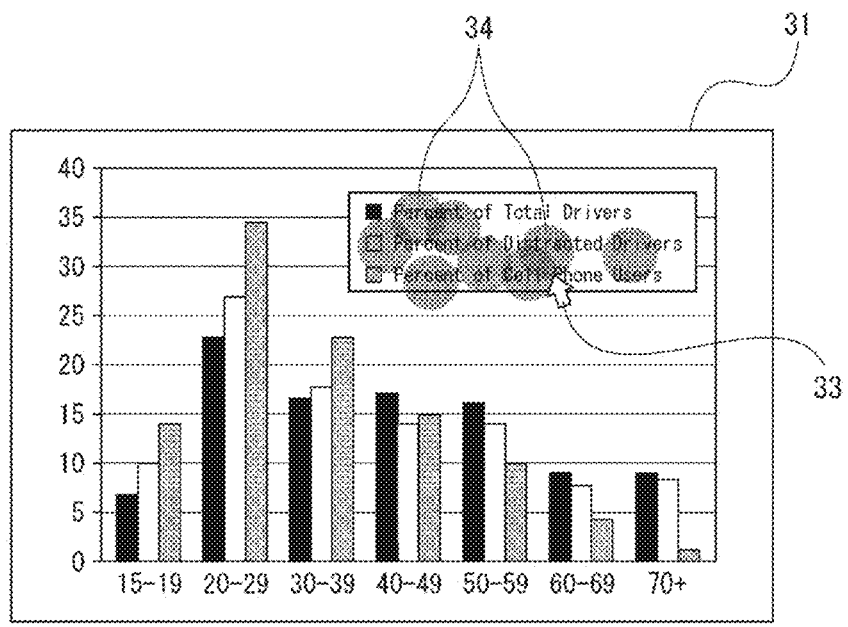
[Fig. 6]
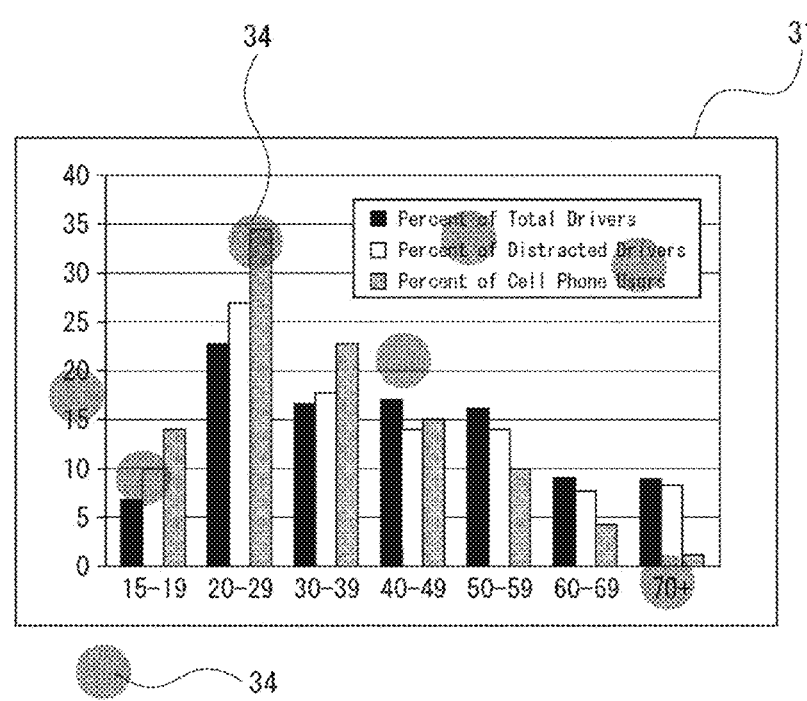

[Fig. 7]
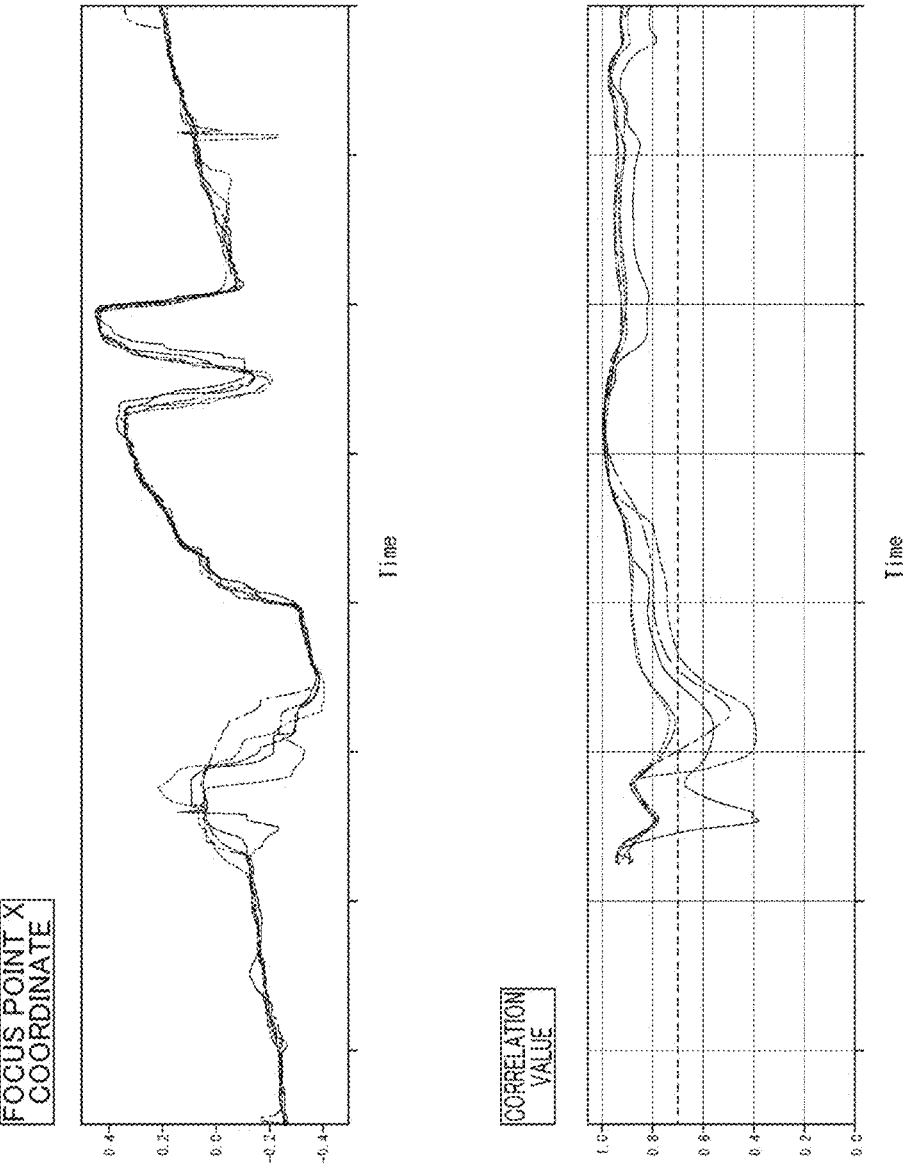

[Fig. 8]
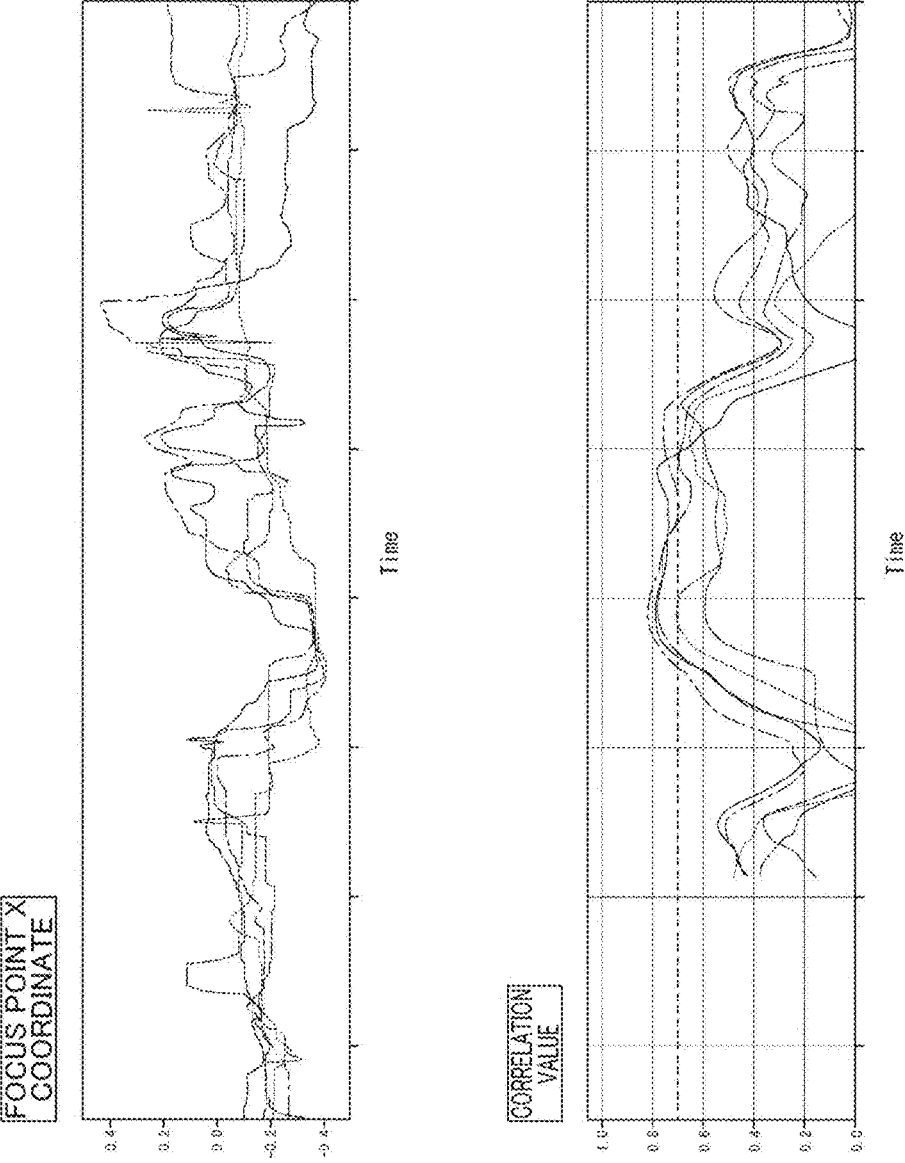

[Fig. 9]
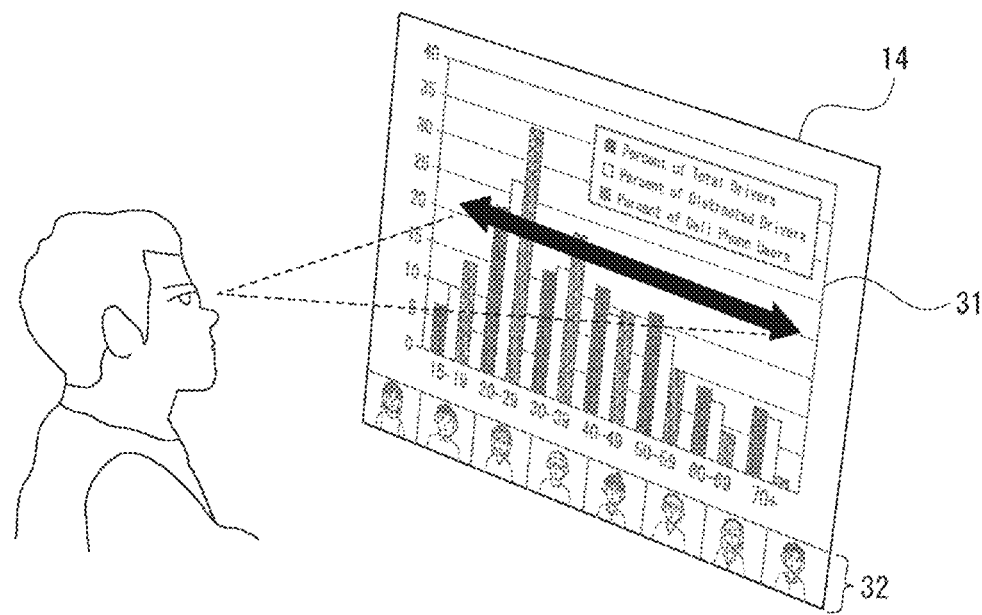
[Fig. 10]
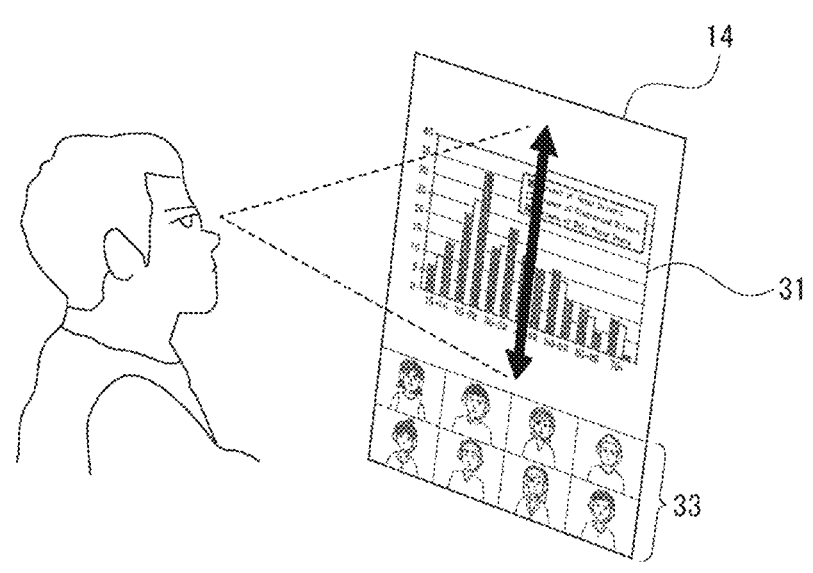

[Fig. 11]
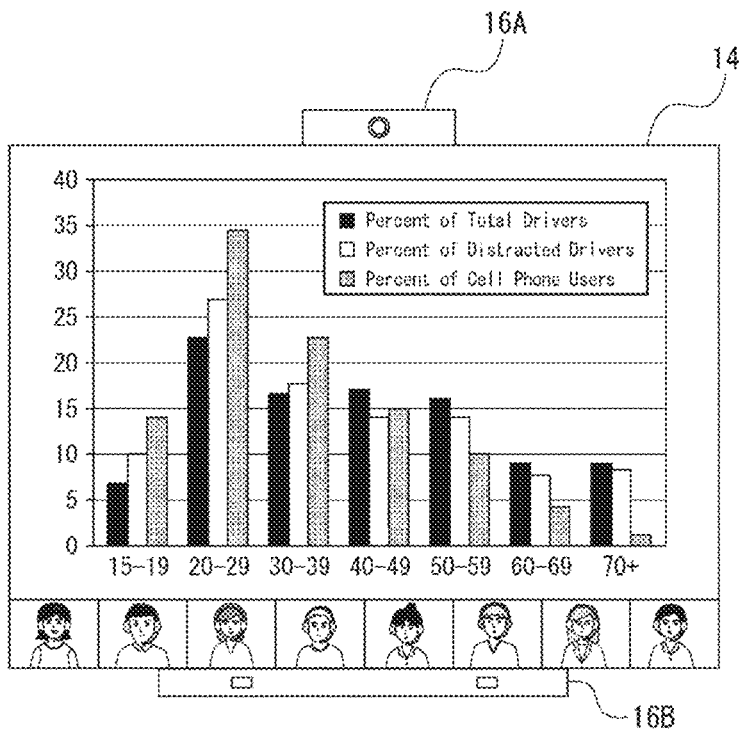

[Fig. 12]
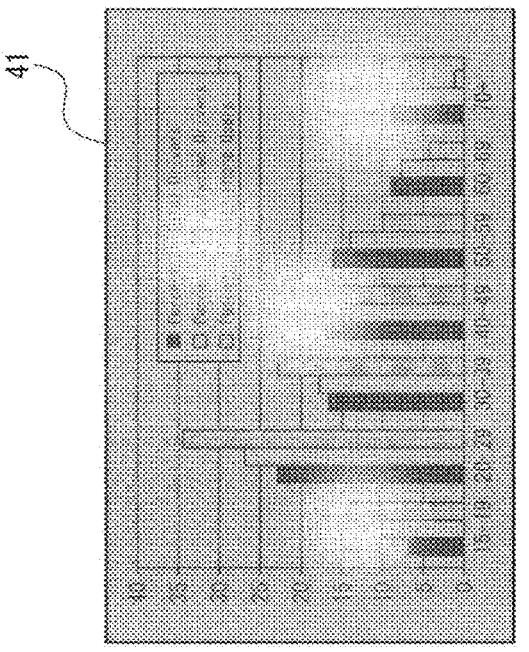
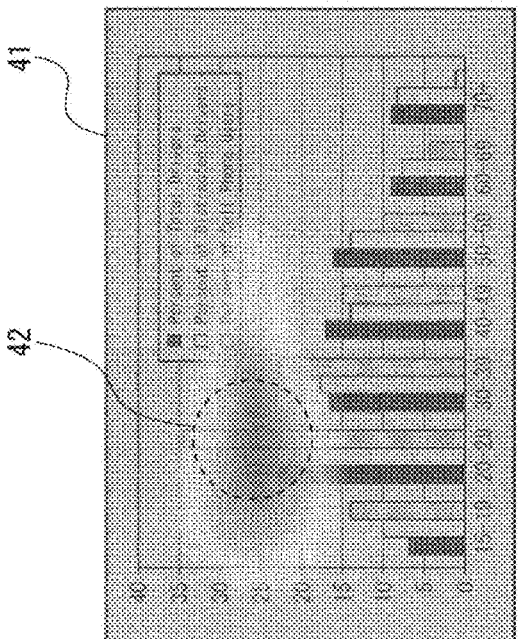

[Fig. 13]
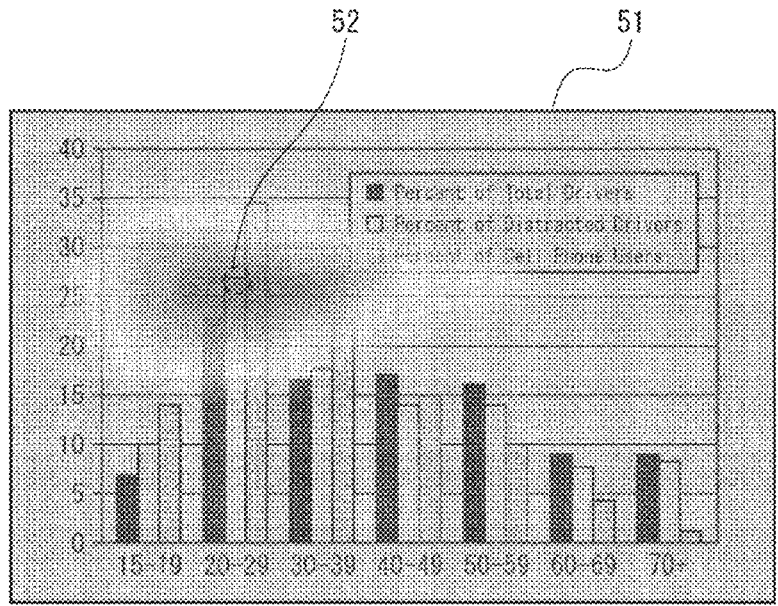
[Fig. 14]
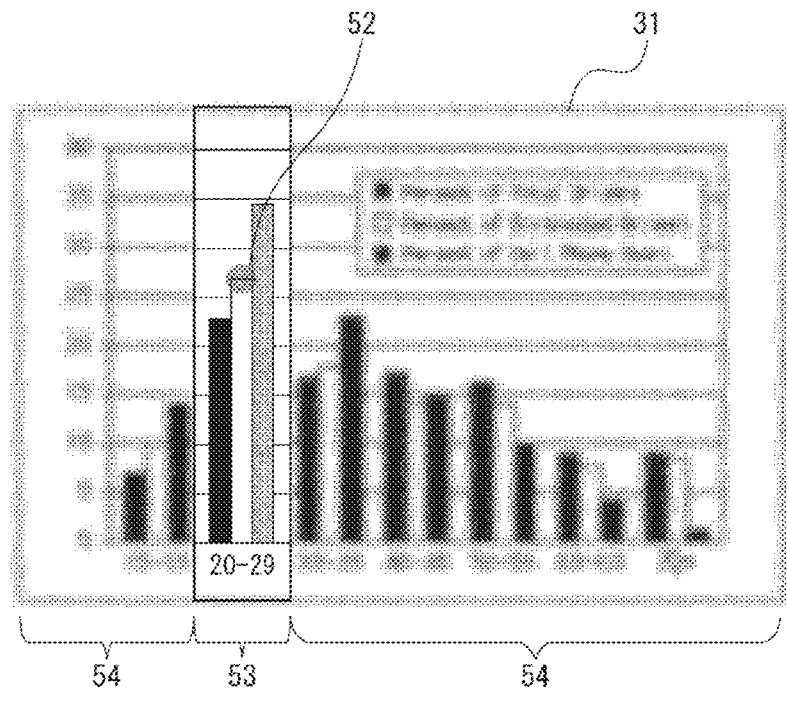

[Fig. 15]
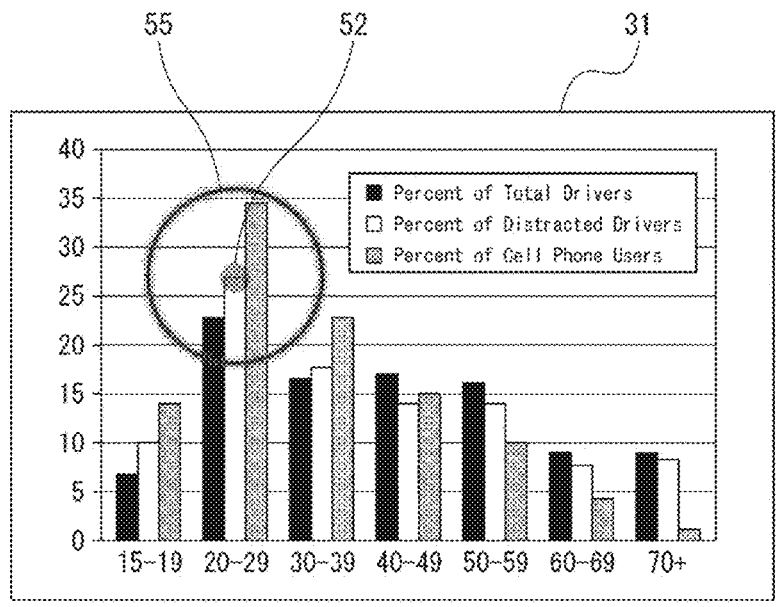
[Fig. 16]
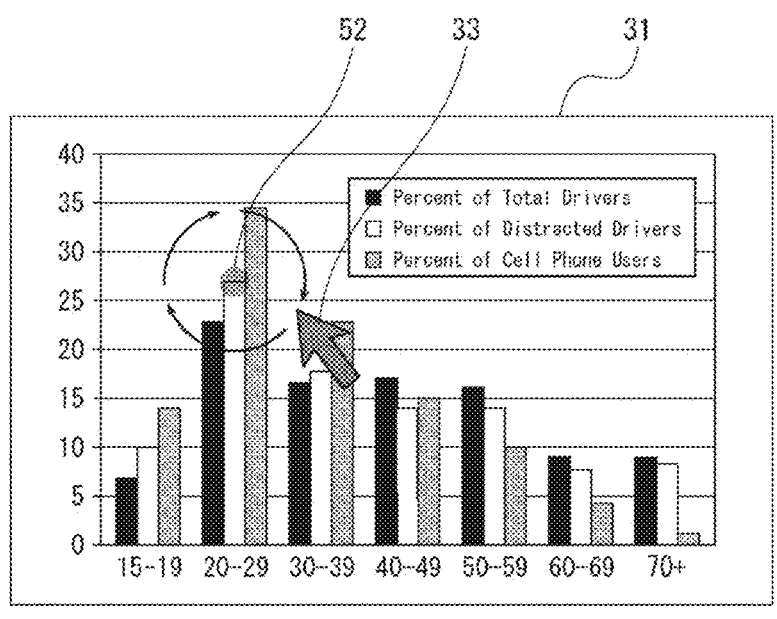

[Fig. 17]
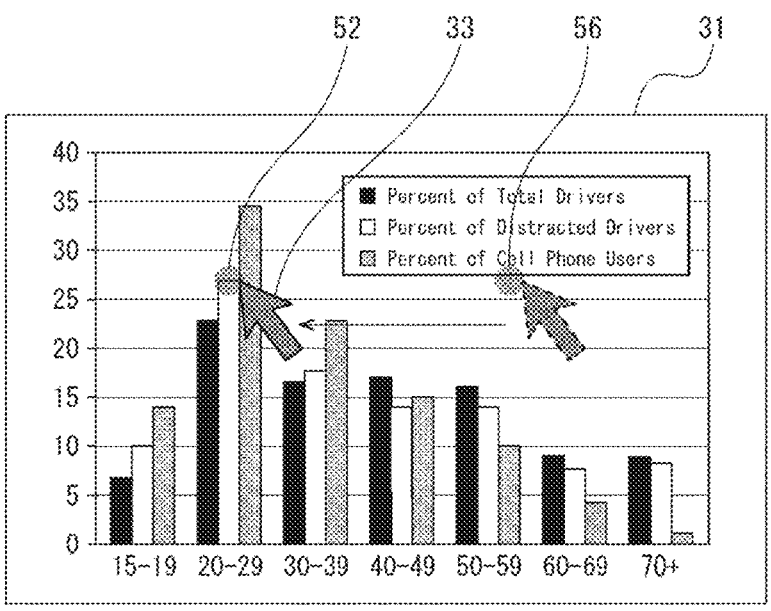

[Fig. 18]
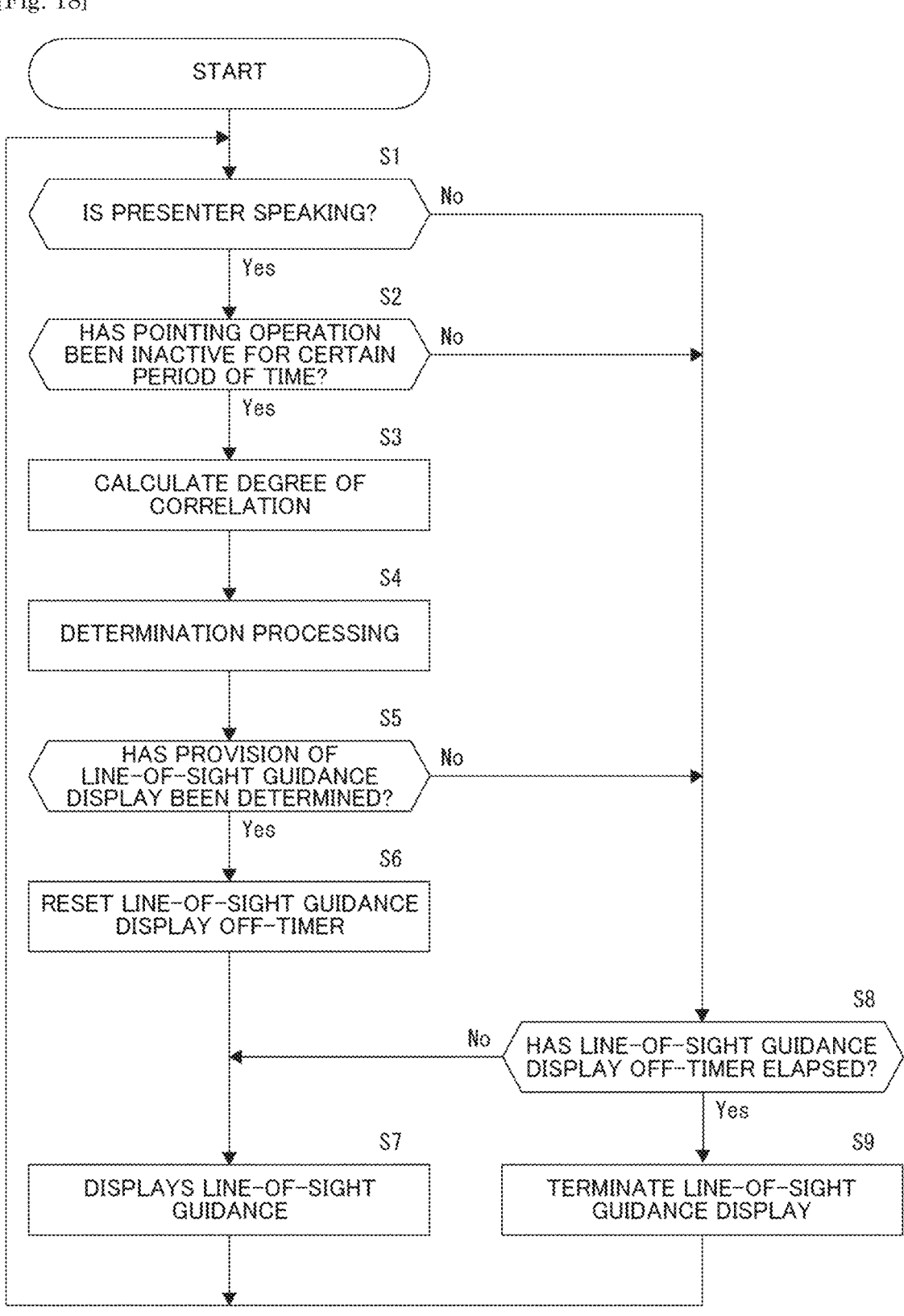

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2023/019671 (filed on May 26, 2023) under 35 U.S.C. § 371, which claims priority to Japanese Patent Application No. 2022-092460 (filed on Jun. 7, 2022), which are all hereby incorporated by reference in their entirety.

TECHNICAL FIELD

The present technique relates to an information processing device, an information processing method, and a program and particularly relates to a technique for online communications.

BACKGROUND ART

For example, PTL1 describes a device that displays a guidance image for guiding the lines of sight of participants (viewers) to the position of attention of a presenter when it is determined that the participants do not focus attention on an image portion corresponding to the position of attention of the presenter who makes a presentation through a network.

CITATION LIST

Patent Literature

PTL 1: JP 2018-77417A

SUMMARY

Technical Problem

In the foregoing device, if the presenter does not constantly focus attention on an image portion being explained, the position of attention of the presenter may be frequently displaced from those of viewers, so that a guidance image may be frequently displayed. In this case, the foregoing device may confuse viewers and disable effective guidance of viewer's lines of sight.

Accordingly, an object of the present technique is to effectively guide a viewer's line of sight.

Solution to Problem

An information processing device according to the present technique includes a line-of-sight information acquisition unit that acquires line-of-sight information about viewers on a shared screen displayed on a display unit, and a line-of-sight guidance display determination unit that determines whether to display line-of-sight guidance for guiding lines of sight of the viewers, on the basis of the line-of-sight information about the viewers.

Thus, the information processing devices can display line-of-sight guidance regardless of the focus point of a presenter when the focus points of the viewers are dispersed.

BRIEF DESCRIPTION OF DRAWINGS

FIG. 1 is an explanatory drawing of the configuration of an online communication system.

FIG. 2 is an explanatory drawing of the configuration of an information processing device.

FIG. 3 is an explanatory drawing of the functional configuration of a CPU.

FIG. 4 is an explanatory drawing of a shared screen displayed in online communications.

FIG. 5 is an explanatory drawing of the focus points of viewers when a moving pointer is displayed.

FIG. 6 is an explanatory drawing of the focus points of the viewers when the moving pointer is not displayed.

FIG. 7 is an explanatory drawing of graphs when a correlation value is high.

FIG. 8 is an explanatory drawing of graphs when a correlation value is low.

FIG. 9 is an explanatory drawing of line-of-sight information used for calculating a correlation value when a display unit is horizontally oriented.

FIG. 10 is an explanatory drawing of line-of-sight information used for calculating a correlation value when the display unit is vertically oriented.

FIG. 11 is an explanatory drawing of a method for calculating a correlation value when multiple devices are provided as line-of-sight detectors.

FIG. 12 shows heat maps based on line-of-sight information.

FIG. 13 shows the heat map of line-of-sight information about a presenter.

FIG. 14 is an explanatory drawing showing an example of line of sight guidance display according to specific example 1.

FIG. 15 is an explanatory drawing showing an example of line-of-sight guidance display according to specific example 2.

FIG. 16 is an explanatory drawing showing an example of line-of-sight guidance display according to specific example 3.

FIG. 17 is an explanatory drawing showing an example of line-of-sight guidance display according to specific example 4.

FIG. 18 is a flowchart showing a flow of line of sight guidance display control.

DESCRIPTION OF EMBODIMENT

Hereinafter, an embodiment will be described in the following order.

<1. Configuration of online communication system 1>
<2. Configuration of information processing device 2>
<3. Outline of online communications>
<4. Determination processing>
<5. Line-of-sight guidance display processing>
<6. Flow of line-of-sight guidance display control>
<7. Other configuration examples of online communication system 1>
<8. Summary of embodiment>
<9. Present technique>

1. Configuration of Online Communication System 1

The configuration of an online communication system 1 as an embodiment of the present technique will be described first. FIG. 1 is an explanatory drawing of the configuration of the online communication system 1.

As illustrated in FIG. 1, the online communication system 1 includes a plurality of information processing devices 2.

The information processing devices 2 are connected via a network 3, e.g., the Internet and can communicate with one another via the network 3.

The online communication system 1 enables online communications such as online conferences and online classes by sharing displayed contents such as documents and images as a shared screen among the multiple information processing devices 2.

Hereinafter, the information processing device 2 used by a presenter will be referred to as a presenter-side information processing device 2A while the information processing device 2 used by a viewer will be referred to as a viewer-side information processing device 2B. When the presenter-side information processing device 2A and the viewer-side information processing device 2B are collectively described, the information processing devices will be simply denoted as information processing devices 2.

In the description, "presenter" refers to a person who presents contents displayed as a shared screen.

Furthermore, "viewer" refers to a person who views the shared screen and a presentation made by the presenter.

In the online communication system 1, the single (one) presenter-side information processing device 2A is provided in principle and other information processing devices serve as the viewer-side information processing devices 2B. Thus, the multiple viewer-side information processing devices 2B are provided in ordinary cases. However, only the single (one) viewer-side information processing device 2B may be provided.

2. Configuration of Information Processing Device 2

FIG. 2 is an explanatory drawing of the configuration of the information processing device 2. As illustrated in FIG. 2, the information processing device 2 is a computer including a central processing unit (CPU) 10, a read only memory (ROM) 11, a random access memory (RAM) 12, and a storage unit 13. The information processing device 2 is, for example, a personal computer, a portable terminal device such as a smartphone, or a tablet.

The CPU 10 exercises control over the information processing device 2 by expanding and executing a program in the RAM 12, the program being stored in the ROM 11 or the storage unit 13.

The storage unit 13 is composed of, for example, a storage medium such as a solid-state memory. For example, the storage unit 13 can store various kinds of information, which will be described later. Moreover, the storage unit 13 can be used for storing program data that allows the CPU 10 to execute various kinds of processing.

The information processing device 2 includes a display unit 14, an operation unit 15, a line-of-sight detector 16, a communication unit 17, a microphone 18, a speaker 19, and an imaging unit 20 in addition to the CPU 10, the ROM 11, the RAM 12, and the storage unit 13.

The display unit 14 is, for example, a liquid crystal display or an organic light emitting diode (OLPD) display that displays various screens (images).

The operation unit 15 is an input device used by a user, for example, various operators or operating devices such as a keyboard, a mouse, a button, a dial, a touch pad, and a touch panel. When a user operation is detected by the operation unit 15, a signal corresponding to the input operation is input to the CPU 10.

The line-of-sight detector 16 is a device that detects a user's line-of-sight direction. The line-of-sight detector 16 detects a user's line-of-sight direction by the corneal reflex method or the detection of face features.

When a user's line-of-sight direction is detected by the corneal reflex method, the line-of-sight detector 16 includes an infrared source that emits infrared rays and an infrared camera that receives infrared rays, and the line-of-sight detector 16 detects a user's line-of-sight direction on the basis of an image obtained by receiving infrared rays through an infrared camera after the infrared rays are emitted from the infrared source and are reflected by a user's pupil.

When a user's line-of-sight direction is detected by the detection of face features, the line-of-sight detector 16 includes a visible light camera that receives visible light, and the line-of-sight detector 16 detects features by analyzing a user's face image captured by the visible light camera and estimates a user's line-of-sight direction on the basis of, for example, the orientation of the face and the position of an iris.

Moreover, the line-of-sight detector 16 detects the gaze position of the user, that is, the coordinates (X, Y) of a user's focus point on a shared screen 31 (see FIG. 4) displayed on the display unit 14, on the basis of, for example, the detected line-of-sight direction of the user and the positional relationship between the line-of-sight detector 16 and the display unit 14. X indicates coordinates in the horizontal direction, and Y indicates coordinates in the vertical direction. Furthermore, the line-of-sight detector 16 may detect the yaw and pitch of a user's pupil (collectively referred to as a rotation of the pupil) on the basis of a change of the user's line-of-sight direction in addition to or instead of the coordinates (X, Y) of the focus point.

The line-of-sight detector 16 outputs line-of-sight information to the CPU 10 or transmits the line-of-sight information to another information processing device 2 through the communication unit 17, the line-of-sight information including at least the coordinates (X, Y) of the detected focus point of the user or the rotation (yaw, pitch) of the pupil.

The line-of-sight detector 16 may be different from the foregoing configuration if the coordinates (X, Y) of the user's focus point and the rotation (yaw, pitch) of the pupil can be detected. Moreover, the line-of-sight detector 16 may detect only one of the X coordinate and the Y coordinate of the coordinates (X, Y) of the focus point. Likewise, the line-of-sight detector 16 may detect only one of the yaw and pitch of the rotation (yaw, pitch) of the pupil.

The line-of-sight detector 16 may detect line-of-sight information about the user in coordination with the CPU 10.

The communication unit 17 communicates with another information processing device 2 via the network 3.

The microphone 18 collects sound from the user.

The speaker 19 outputs sound to the user.

The imaging unit 20 is, for example, an image sensor of a charge coupled device (CCD) or a complementary metal oxide semiconductor (CMOS) and captures an image of a user's face (upper body).

FIG. 3 is an explanatory drawing of the functional configuration of the CPU 10. As illustrated in FIG. 3, the CPU 10 acts as a display control unit 21, a presenter identification unit 22, an operation information acquisition unit 23, a line-of-sight information acquisition unit 24, a correlation degree calculation unit 25, and a line-of-sight guidance display determination unit 26.

The display control unit 21 performs control on the screen display of the display unit 14.

The presenter identification unit 22 identifies one of the users of the information processing devices 2 as a presenter on the basis of sound input to the microphone 18 or sound transmitted from another information processing device 2. In other words, the presenter identification unit 22 identifies the presenter-side information processing device 2A from among the multiple information processing devices 2.

The operation information acquisition unit 23 acquires operation information about a pointing operation on the shared screen 31 from, for example, the presenter-side information processing device 2A.

The line-of-sight information acquisition unit 24 acquires line-of-sight information from the line-of-sight detector 16 and acquires line-of-sight information from another information processing device 2.

The correlation degree calculation unit 25 calculates the degree of correlation of line-of-sight information between multiple viewers on the basis of the line-of-sight information acquired by the line-of-sight information acquisition unit 24.

In this case, the degree of correlation is an index indicating the correlation of line-of-sight information (focus point) between the multiple viewers, for example, a correlation value (correlation coefficient) or the degree of dispersion.

The line-of-sight guidance display determination unit 26 determines whether to provide line-of-sight guidance display for guiding a viewer's line of sight, on the basis of the line-of-sight information acquired by the line-of-sight information acquisition unit 24, more specifically, the correlation degree calculated by the correlation degree calculation unit 25.

The detail of the display control unit 21, the presenter identification unit 22, the operation information acquisition unit 23, the line-of-sight information acquisition unit 24, the correlation degree calculation unit 25, and the line-of-sight guidance display determination unit 26 will be described later. The display control unit 21, the presenter identification unit 22, the operation information acquisition unit 23, the line-of-sight information acquisition unit 24, the correlation degree calculation unit 25, and the line-of-sight guidance display determination unit 26 may partially fail to function depending upon whether the information processing device 2 is the presenter-side information processing device 2A or the viewer-side information processing device 2B.

3. Outline of Online Communications

FIG. 4 is an explanatory drawing of the shared screen 31 displayed in online communications. For example, the display control unit 21 displays the shared screen 31 showing contents on the display unit 14 during online communications as illustrated in FIG. 4, the shared screen 31 being shared by the information processing devices 2.

Moreover, the display control unit 21 displays a portrait screen 32 in, for example, a lower part of the shared screen 31, the portrait screen 32 including user's faces captured by the imaging units 20 of the information processing devices 2.

The shared screen 31 is shared by transmitting, for example, screen data of the shared screen 31 displayed on the display unit 14 of the presenter-side information processing device 2A, from the presenter-side information processing device 2A to the viewer-side information processing devices 2B.

Thus, in all the information processing devices 2 participating online communications, the shared screen 31 and the portrait screen 32 are displayed on the display unit 14.

Furthermore, the display unit 14 displays a pointer 33 moving in response to, for example, a pointing operation on the shared screen 31 of the presenter-side information processing device 2A. In the presenter-side information processing device 2A, the position (coordinates) of the pointer 33 moving on the shared screen 31 in response to an operation on the operation unit 15 is detected by the CPU 10, and operation information about the position is transmitted to the viewer-side information processing devices 2B. The display control unit 21 of the viewer-side information processing device 2B displays the moving pointer 33 on the basis of the transmitted operation information.

Thus, the pointer 33 is displayed at the same position on the shared screen 31 in the presenter-side information processing device 2A and the viewer-side information processing devices 2B. However, a pointing operation is not necessarily performed in the presenter-side information processing device 2A and may be performed in the viewer-side information processing devices 2B. In this case, the viewer-side information processing device 2B having detected a pointing operation transmits operation information to the presenter-side information processing device 2A and other viewer-side information processing devices 2B.

The information processing device 2 (both of the presenter-side information processing device 2A and the viewer-side information processing device 2B) then transmits a sound collected through the microphone 18 to other information processing devices 2 and outputs, from the speaker 19, sounds transmitted from other information processing devices 2. Thus, sounds are also shared by all the information processing devices 2.

Furthermore, in the present embodiment, the information processing device 2 transmits line-of-sight information detected by the line-of-sight detector 16 to other information processing devices 2. The transmitted line-of-sight information is acquired by the line-of-sight information acquisition unit 24.

FIG. 5 is an explanatory drawing of focus points 34 of viewers when the moving pointer 33 is displayed. FIG. 6 is an explanatory drawing of the focus points 34 of viewers when the moving pointer 33 is not displayed.

When the moving pointer 33 is displayed in response to a pointing operation by a presenter, a viewer can recognize that the presenter is indicating a point near the position of the pointer 33, and thus the viewer moves the line of sight to follow the pointer 33.

In other words, as shown in FIG. 5, the focus points 34 of multiple viewers concentrate on the pointer 33 or near the pointer 33.

When a pointing operation is not performed by the presenter, the moving pointer 33 is not displayed, so that the viewers may have difficulty in recognizing a point indicated by the presenter on the shared screen 31. In such a case, as shown in FIG. 6, the focus points 34 vary among the multiple viewers.

The presenter identification units 22 of all the information processing devices 2 first detect, by using a sound-section detection technique, a speech section for a sound input from the information processing device 2 with the microphone 18 turned on. When a pointing operation is performed during the speech section, the presenter identification unit 22 identifies the information processing device 2 having transmitted a sound with a detected speech, as the presenter-side information processing device 2A.

The presenter identification unit 22 may identify the presenter-side information processing device 2A according to any method other than the foregoing method. For example, the information processing device 2 entitled to a pointing operation may be identified as the presenter-side information processing device 2A. Moreover, whether the information processing device 2 is the presenter-side information processing device 2A or the viewer-side information processing devices 2B may be preset. In this case, the presenter identification unit 22 does not need to identify the presenter-side information processing device 2A.

When the moving pointer 33 is not displayed, the viewer-side information processing device 2B performs line-of-sight guidance display control for providing line-of-sight guidance display on the basis of line-of-sight information about multiple viewers.

The line-of-sight guidance display control includes determination processing for determining whether to display line-of-sight guidance by calculating the degree of correlation of line-of-sight information between multiple viewers, and line-of-sight guidance display processing for displaying line-of-sight guidance.

The determination processing and the line-of-sight guidance display processing will be described below. In the description of the determination processing and the line-of-sight guidance display processing, a viewer using the viewer-side information processing devices 2B for performing the processing is referred to as a viewer concerned, whereas viewers using other viewer-side information processing devices 2B are referred to as other viewers.

4. Determination Processing

In the determination processing, the degree of correlation of line-of-sight information between multiple viewers is calculated by the correlation degree calculation unit 25, and whether to display line-of-sight guidance is determined by the line-of-sight guidance display determination unit 26 on the basis of the degree of correlation. A specific example of the determination processing will be described below.

4.1. Specific Example 1

FIG. 7 is an explanatory drawing of graphs when a correlation value is high. FIG. 8 is an explanatory drawing of graphs when a correlation value is low. In specific example 1, the correlation degree calculation unit 25 calculates a correlation value as a degree of correlation between multiple viewers.

The line-of-sight information acquisition unit 24 acquires transmitted line-of-sight information about other viewers (hereinafter referred to as other viewers line-of-sight information) from other viewer-side information processing devices 2B. The correlation degree calculation unit 25 calculates a correlation value between the acquired other viewers line-of-sight information and line-of-sight information about a viewer concerned (hereinafter will be referred to as viewer-concerned line-of-sight information), the line-of-sight information being detected by the line-of-sight detector 16. The correlation value is calculated for each piece of the other viewers line-of-sight information by using, for example, a product-moment correlation coefficient of Pearson.

In other words, the correlation degree calculation unit 25 calculates, for each of other viewers, the correlation value of line-of-sight information between the viewer concerned and other viewers. The correlation value calculated thus is any value in the range of, for example, −1 to 1. The correlation value indicates a stronger correlation toward 1.

The correlation degree calculation unit 25 then calculates the mean value of calculated correlation values of respective other viewers as the correlation value of the viewer concerned. When the correlation value of the viewer concerned is calculated, the correlation degree calculation unit 25 transmits the correlation value of the viewer concerned to other viewer-side information processing devices 2B. Thus, all the viewer-side information processing devices 2B can acquire the correlation values of all viewers.

The upper graph of FIG. 7 and the upper graph of FIG. 8 show temporal changes of the X coordinates of five viewers, the lower graph of FIG. 7 shows the correlation values of the five viewers shown in the upper graph of FIG. 7, and the lower graph of FIG. 8 shows the correlation values of the five viewers shown in the upper graph of FIG. 8. In the examples of FIGS. 7 and 8, the correlation values are calculated using the values of X coordinates as line-of-sight information.

As shown in FIG. 7, when the five viewers look at almost the same position on the shared screen 31, the five viewers have high correlation values.

As shown in FIG. 8, when the five viewers look at different positions on the shared screen 31, the five viewers have low correlation values.

As described above, when the viewers have low correlation values, the viewers look at different positions on the shared screen 31. It is estimated that a position indicated by the presenter is not recognized by the viewers.

Thus, for example, when the ratio of correlation values equal to or smaller than a predetermined threshold value to the correlation values of all viewers is equal to or larger than a predetermined value, the line-of-sight guidance display determination unit 26 determines that line-of-sight guidance is to be displayed.

As shown in the examples of FIGS. 7 and 8, it is assumed that the threshold value indicated by a broken line in FIGS. 7 and 8 is set at 0.7 and the predetermined value is set at 60%. In this case, when the ratio of correlation values of 0.7 or less is 60% (three fifths) or larger, that is, when three or more viewers have correlation values of 0.7 or less, the line-of-sight guidance display determination unit 26 determines that line-of-sight guidance is to be displayed.

When only the single viewer-side information processing device 2B is provided, that is, when only one viewer is present, the correlation degree calculation unit 25 may calculate a correlation value between line-of-sight information about the viewer concerned and presenter's line-of-sight information transmitted from the presenter-side information processing device 2A, as the correlation value of the viewer concerned. Thereafter, when the correlation value of the viewer concerned is equal to or smaller than the threshold value, the line-of-sight guidance display determination unit 26 may determine that line-of-sight guidance is to be displayed.

4.2. Specific Example 2

FIG. 9 is an explanatory drawing of line-of-sight information used for calculating a correlation value when the display unit 14 is horizontally oriented. FIG. 10 is an explanatory drawing of line-of-sight information used for calculating a correlation value when the display unit 14 is vertically oriented.

In specific example 2, if line-of-sight information acquired from one of the information processing devices 2 includes multiple information items, the information items to be used for calculating correlation values are switched according to the aspect ratio of the display unit 14.

As shown in FIG. 9, when the display unit 14 is horizontally oriented, the line of sight of a viewer moves largely in the lateral direction (horizontal direction) but hardly moves in the longitudinal direction (vertical direction). Hence, when the display unit 14 is horizontally oriented, the correlation degree calculation unit 25 calculates a correlation value by using the X coordinate values of line-of-sight information.

As shown in FIG. 10, when the display unit 14 is vertically oriented, the line of sight of a viewer hardly moves in the lateral direction (horizontal direction) but moves largely in the longitudinal direction (vertical direction). Hence, when the display unit 14 is vertically oriented, the correlation degree calculation unit 25 calculates a correlation value by using the Y coordinate values of line-of-sight information.

As described above, information items to be used for calculating a correlation value are switched according to the aspect ratio of the display unit 14, thereby calculating a correlation value with high accuracy.

If line-of-sight information includes multiple information items, the information items to be used for calculating correlation values may be determined on the basis of the aspect ratio of contents instead of the aspect ratio of the display unit 14.

As in specific example 1, for example, when the ratio of correlation values equal to or smaller than a predetermined threshold value to the correlation values of all viewers is equal to or larger than a predetermined value, the line-of-sight guidance display determination unit 26 determines that line-of-sight guidance is to be displayed.

4.3. Specific Example 3

In specific example 3, if line-of-sight information acquired from one of the information processing devices 2 includes multiple information items, weights are assigned to the information items to calculate a correlation value.

For example, when the values of the X coordinate and the Y coordinate of a focus point are included as line-of-sight information, the correlation degree calculation unit 25 calculates a correlation value Cx of the value of the X coordinate and a correlation value Cy of the value of the Y coordinate. Moreover, the correlation degree calculation unit 25 calculates a correlation value C using a preset weight wx for an X coordinate and a preset weight wy for a Y coordinate according to formula (1):

$$C = Cx \cdot wx + Cy \cdot wy \qquad (1)$$

As described above, the correlation value is calculated by assigning the weights to the information items, so that the correlation value can be calculated with higher accuracy than in the calculation of a correlation value using a single information item.

As in specific example 1, for example, when the ratio of the correlation values C equal to or smaller than a predetermined threshold value to the correlation values C of all viewers is equal to or larger than a predetermined value, the line-of-sight guidance display determination unit 26 determines that line-of-sight guidance is to be displayed.

4.4. Specific Example 4

FIG. 11 is an explanatory drawing of a method for calculating a correlation value when multiple devices are provided as the line-of-sight detectors 16. In specific example 4, for example, when a visible light camera 16A and an infrared device 16B are provided as the line-of-sight detectors 16 as illustrated in FIG. 11, the correlation degree calculation unit 25 calculates a correlation value using the detection result of the device having high reliability or stability.

In this configuration, the infrared device 16B includes an infrared camera and an infrared source. The infrared device 16B can detect user's line-of-sight information with higher accuracy than the visible light camera 16A but has a narrower detection range.

On the other hand, the visible light camera A has lower accuracy but has a wider detection range than the infrared device 16B.

Thus, the viewer-side information processing device 2B transmits one of line-of-sight information detected using the visible light camera 16A and line-of-sight information detected using the infrared device 16B to other viewer-side information processing devices 2B such that the transmitted line-of-sight information has higher reliability or stability. Thus, as in specific example 1, the correlation degree calculation unit 25 can calculate a correlation value by using line-of-sight information having high reliability or stability.

As in specific example 1, for example, when the ratio of correlation values equal to or smaller than a predetermined threshold value to the correlation values of all viewers is equal to or larger than a predetermined value, the line-of-sight guidance display determination unit 26 determines that line-of-sight guidance is to be displayed.

Moreover, the viewer-side information processing device 2B may transmit both of line-of-sight information detected using the visible light camera 16A and line-of-sight information detected using the infrared device 16B to other viewer-side information processing devices 2B. In this case, the correlation degree calculation units 25 of other viewer-side information processing devices 2B can calculate correlation values by using line-of-sight information having high reliability or stability.

Alternatively, as in specific example 3, the correlation degree calculation unit 25 may calculate a correlation value by assigning weights to line-of-sight information detected using the visible light camera 16A and line-of-sight information detected using the infrared device 16B.

4.5. Specific Example 5

FIG. 12 shows heat maps 41 based on line-of-sight information. The heat map 41 on the left side of FIG. 12 shows the concentrating focus points of multiple viewers. The heat map 41 on the right side of FIG. 12 shows the dispersing focus points of multiple viewers.

In specific example 5, the heat map 41 is produced as a degree of correlation, and whether to display line-of-sight guidance is determined on the basis of the heat map 41.

When line-of-sight information is acquired by the line-of-sight information acquisition unit 24, the correlation degree calculation unit 25 counts the coordinates of the focus points of viewers on the shared screen 31 on the basis of the acquired line-of-sight information about all viewers, so that the heat map 41 indicating the degree of concentration (degree of dispersion) of line-of-sight information (focus points) is produced. When the heat map 41 is produced, coordinates (X, Y) are desirably included as line-of-sight information.

As shown in the left side of FIG. 12, when the produced heat map 41 includes a concentrated region 42 having a predetermined value or more, which assumes that the focus points of multiple viewers are concentrating (the focus points of multiple viewers are hardly dispersed), the line-of-sight guidance display determination unit 26 determines that line-of-sight guidance is not to be displayed.

As shown in the right side of FIG. 12, when the produced heat map 41 does not include the concentrated region 42 having a predetermined value or more (the focus points of multiple viewers are dispersed widely), the line-of-sight guidance display determination unit 26 determines that line-of-sight guidance is to be displayed.

4.6. Other Examples

In the foregoing specific examples 1 to 5, a correlation value or the heat map 41 is calculated (produced) as a degree of correlation. A degree of correlation may be, for example, a degree of similarly obtained using dynamic time warping (DTW).

Moreover, the line-of-sight guidance display determination unit 26 may determine whether to display line-of-sight guidance on the basis of a drowsiness level or a posture change of a viewer in addition to a degree of correlation calculated by the correlation degree calculation unit 25.

When a drowsiness level is used, for example, an image captured by the imaging unit 20 may be subjected to image analysis to calculate the drowsiness level of a viewer, or the drowsiness level of the viewer may be calculated by a vital sensor, which is not illustrated. Thereafter, when the drowsiness level of the viewer is equal to or larger than a predetermined value, the line-of-sight guidance display determination unit 26 determines that line-of-sight guidance is to be displayed.

When a posture change is used, for example, the line-of-sight guidance display determination unit 26 detects the presence or absence of a tilt of a viewer's head by performing image analysis on an image captured by the imaging unit 20. If a tilt of the viewer's head is detected, the line-of-sight guidance display determination unit 26 determines that line-of-sight guidance is to be displayed.

Moreover, the line-of-sight guidance display determination unit 26 may determine that line-of-sight guidance is not to be displayed until a predetermined time period has elapsed since contents on the shared screen 31 are switched. This is because viewers look at the overall shared screen 31 and thus may have a low degree of correlation immediately after the contents are switched.

Moreover, the line-of-sight guidance display determination unit 26 may determine whether to display line-of-sight guidance in response to an instruction transmitted from the presenter-side information processing device 2A, that is, an instruction from a presenter.

Furthermore, when contents on the shared screen 31 are recognized as an image including only a short sentence such as "Thank you for your attention" or only a single small figure, that is, when the lines of sight of viewers are likely to concentrate at the same time, the line-of-sight guidance display determination unit 26 may determine that line-of-sight guidance is not to be displayed.

Moreover, when contents on the shared screen 31 are recognized as an image including only a blank or only a solid fill, line-of-sight guidance is not necessary and thus the line-of-sight guidance display determination unit 26 may determine that line-of-sight guidance is not to be displayed.

The correlation degree calculation unit 25 may perform image analysis on contents on the shared screen 31 and determine information used in the calculation of a correlation value according to the orientation of sentences (characters) when the contents include sentences. For example, in the case of horizontally written sentences, the correlation degree calculation unit 25 calculates a correlation value using the X coordinate values of line-of-sight information, whereas in the case of vertically written sentences, the correlation degree calculation unit 25 calculates a correlation value by using the Y coordinate values of the line-of-sight information.

When the contents include sentences, the correlation degree calculation unit 25 may calculate a degree of correlation according to the reciprocating pattern of viewer's lines of sight based on the line-of-sight information.

5. Line-of-Sight Guidance Display Processing

In line-of-sight guidance display processing, when the line-of-sight guidance display determination unit 26 determines that line-of-sight guidance is to be displayed, the line-of-sight guidance is displayed by the display control unit 21.

FIG. 13 shows a heat map 51 of line-of-sight information about a presenter. The display control unit 21 counts the coordinates of the focus points of the presenter on the shared screen 31 on the basis of line-of-sight information transmitted from the presenter-side information processing device 2A, so that the heat map 51 indicating the degree of concentration of line-of-sight information about the presenter is produced as shown in FIG. 13.

The display control unit 21 then specifies coordinates most frequently viewed on the shared screen 31 by a presenter, as a highest frequency position 52 on the basis of the produced heat map 51. The highest frequency position is a position (coordinates) most frequently viewed on the shared screen 31 by the presenter, assuming that the highest frequency position is located in a region explained on the shared screen 31 by the presenter.

Thus, when specifying the highest frequency position 52, the display control unit 21 displays line-of-sight guidance to move the lines of sight of viewers to the highest frequency position 52. A specific example of the line-of-sight guidance display processing will be described below.

5.1. Specific Example 1

FIG. 14 is an explanatory drawing showing an example of line-of-sight guidance display according to specific example 1. In specific example 1, as shown in FIG. 14, the display control unit 21 displays a region 53 as it is with a predetermined width in the horizontal direction with respect to the highest frequency position 52 on the shared screen 31, and a blurred region 54 other than the region 53.

In specific example 1, however, the line-of-sight guidance display determination unit 26 may display a region as it is with a predetermined width in the vertical direction with respect to the highest frequency position 52 on the shared screen 31, and a blurred region other than the region.

In other words, in specific example 1, the line-of-sight guidance display determination unit 26 displays a region as it is over a predetermined range with respect to the highest frequency position 52 on the shared screen 31, and a blurred region other than the region. In particular, when the shared screen 31 shows a graph, a region having a predetermined width perpendicularly (horizontally or vertically) to the extending direction of the graph is preferably displayed as it is.

Thus, the blurred region 54 becomes less visible, causing viewers to naturally move their lines of sight to the region 53 displayed as it is.

5.2. Specific Example 2

FIG. 15 is an explanatory drawing showing an example of line-of-sight guidance display according to specific example 2. In specific example 2, the display control unit 21 specifies the highest frequency position 52 as in specific example 1. As shown in FIG. 15, the display control unit 21 displays a marker 55 in a predetermined shape, e.g., a circle with respect to the highest frequency position 52.

Thus, viewers can recognize that a region surrounded by the marker 55 is a region indicated by a presenter, so that the lines of sight of the viewers are moved to the region surrounded by the marker 55.

5.3. Specific Example 3

FIG. 16 is an explanatory drawing showing an example of line-of-sight guidance display according to specific example 3. In specific example 3, the display control unit 21 specifies the highest frequency position 52 as in specific example 1. As shown in FIG. 16, the display control unit 21 displays the pointer 33 moving in, for example, a circular form as indicated by arrows in FIG. 16 with respect to the highest frequency position 52.

Thus, viewers can recognize that a region in the moving range of the pointer 33 is a region indicated by a presenter, so that the lines of sight of the viewers are moved to the region in the moving range of the pointer 33.

5.4. Specific Example 4

FIG. 17 is an explanatory drawing showing an example of line-of-sight guidance display according to specific example 4. In specific example 4, the display control unit 21 specifies the highest frequency position 52 as in specific example 1. As shown in FIG. 17, the display control unit 21 provides line-of-sight guidance animation that displays the pointer 33 moving from a focus point 56 of a viewer concerned to the highest frequency position 52.

Thus, viewers move their lines of sight according to the movement of the pointer 33, so that the lines of sight are moved to a region indicated by a presenter.

5.5. Other Examples

Specific examples 1 to 4 described examples of line-of-sight guidance display. The display control unit 21 may provide another line-of-sight guidance display if the lines of sight of viewers can be moved to the highest frequency position 52.

Alternatively, the display control unit 21 may switch one of specific examples 1 to 4 or another line-of-sight guidance display according to the contents displayed on the shared screen 31. For example, the display control unit 21 may provide line-of-sight guidance display according to specific example 1 when the content is a graph, or provide line-of-sight guidance display according to specific example 3 when a small object is displayed at the highest frequency position 52.

Moreover, when viewers do not move their lines of sight for a predetermined time after line-of-sight guidance is displayed according to, for example, one of specific examples 1 to 4, the display control unit 21 may provide another line-of-sight guidance display.

In specific examples 1 to 4, line-of-sight guidance is displayed to guide the lines of sight of viewers to the highest frequency position 52. However, line-of-sight guidance may be displayed to move the lines of sight to the current focus point of a presenter.

6. Flow of Line-of-Sight Guidance Display Control

FIG. 18 is a flowchart showing a flow of line-of-sight guidance display control. In the viewer-side information processing device 2B, line-of-sight guidance display control is performed according to the flowchart of FIG. 18.

In step S1, the line-of-sight guidance display determination unit 26 determines whether a presenter is speaking or not through sound analysis on sound transmitted from the presenter-side information processing device 2A. When the presenter is speaking (Yes at step S1), in step S2, the line-of-sight guidance display determination unit 26 determines whether a pointing operation has been inactive for a certain period of time or longer on the basis of, for example, operation information transmitted from the presenter-side information processing device 2A. If a pointing operation has been inactive for a certain period of time or longer (Yes at step S2), in step S3, the correlation degree calculation unit 25 calculates a degree of correlation (correlation value or heat map) as described above. In step S4, the line-of-sight guidance display determination unit 26 performs determination processing for determining whether to display line-of-sight guidance on the basis of the calculated degree of correlation.

In step S5, the display control unit 21 determines whether the provision of line-of-sight guidance display has been determined in the determination processing.

If the provision of line-of-sight guidance display has been determined (Yes at step S5), in step S6, the display control unit 21 resets a line-of-sight guidance display off-timer. In step S7, the display control unit 21 displays line-of-sight guidance and returns the processing to step S1.

If the presenter is not speaking (No at step S1), a pointing operation has been performed in a certain period of time (No at step S2), and the provision of line-of-sight guidance display has not been determined (No at step S5), the display control unit 21 determines whether the line-of-sight guidance display off-timer has elapsed in step S8. If the line-of-sight guidance display off-timer has elapsed (Yes at step S8), in step S9, the display control unit 21 terminates the line-of-sight guidance display and returns the processing to step S1. As described above, the line-of-sight guidance display off-timer is set and even if it is determined that line-of-sight guidance display is not necessary, the line-of-sight guidance display is terminated after the lapse of the line-of-sight guidance display off-timer. This can prevent line of sight guidance display from being repeatedly provided and interrupted by a temporary change of the degree of correlation.

7. Other Configuration Examples of Online Communication System 1

The embodiment is not limited to the foregoing specific examples and may be configured as various modifications.

In the embodiment, all the viewer-side information processing devices 2B are configured to perform line-of-sight guidance display control. However, one of the viewer-side information processing devices 2B or the presenter-side information processing device 2A and other information processing devices may perform line-of-sight guidance display control and transmit the result to all the viewer-side information processing devices 2B.

In the embodiment, line-of-sight guidance is displayed when a pointing operation is not performed. However, in the case of a low degree of correlation when a pointing operation is performed, line-of-sight guidance may be displayed because viewers may fail to recognize an indicated region.

8. Summary of Embodiment

As described above, the information processing device 2 of the embodiment includes the line-of-sight information acquisition unit 24 that acquires line-of-sight information about viewers on the shared screen 31 displayed on the display unit 14, and the line-of-sight guidance display determination unit 26 that determines whether to display line-of-sight guidance for guiding the lines of sight of the viewers, on the basis of the line-of-sight information about the viewers.

Thus, the information processing devices 2 can display line-of-sight guidance regardless of the focus point of the presenter when the focus points of the viewers are dispersed. In other words, the information processing devices 2 can display line-of-sight guidance when the viewers may fail to recognize a region indicated by the presenter.

Thus, the information processing devices 2 can effectively guide the lines of sight of the viewers.

The information processing device 2 further includes the operation information acquisition unit 23 that acquires operation information about a pointing operation performed on the shared screen 31 by a presenter. The line-of-sight guidance display determination unit 26 determines whether to display line-of-sight guidance when a pointing operation is not performed.

Thus, the information processing devices 2 can display line-of-sight guidance when a region indicated by the presenter is hardly recognizable by the viewers without a pointing operation.

Furthermore, the correlation degree calculation unit 25 is provided to calculate the degree of correlation of line-of-sight information between multiple viewers, and the line-of-sight guidance display determination unit 26 determines whether to display line-of-sight guidance on the basis of the degree of correlation.

Thus, when the degree of correlation between the focus points of the viewers is low, the information processing devices 2 can display line-of-sight guidance on the assumption that the viewers have not recognized a region indicated by the presenter.

Furthermore, the correlation degree calculation unit 25 calculates the correlation value of line-of-sight information between multiple viewers, and the line-of-sight guidance display determination unit 26 determines whether to display line-of-sight guidance on the basis of the correlation value.

Thus, when the focus points of viewers have low correlation values, the information processing devices 2 can display line-of-sight guidance on the assumption that the viewers have not recognized a region indicated by the presenter.

Furthermore, the correlation degree calculation unit 25 calculates the degree of dispersion of line-of-sight information about viewers, and the line-of-sight guidance display determination unit 26 determines whether to display line-of-sight guidance on the basis of the degree of dispersion.

Thus, when the focus points of viewers have a large degree of dispersion, the information processing devices 2 can display line-of-sight guidance on the assumption that the viewers have not recognized a region indicated by the presenter.

Moreover, the line-of-sight information includes the coordinates of the focus points of viewers on the shared screen 31.

Thus, the information processing devices 2 can determine whether to display line-of-sight guidance on the basis of the coordinates of the focus points of viewers on the shared screen 31.

Moreover, the line-of-sight information includes multiple information items about the lines of sight of viewers, and the correlation degree calculation unit 25 calculates a degree of correlation on the basis of information corresponding to the orientation of characters displayed on the shared screen 31.

Thus, the degree of correlation is calculated on the basis of line-of-sight information about a direction along which viewers are likely to largely move their lines of sight, so that the degree of correlation can be calculated with high accuracy.

Moreover, the line-of-sight information includes multiple information items about the lines of sight of viewers, and the correlation degree calculation unit 25 calculates a degree of correlation on the basis of information corresponding to the aspect ratio of the display unit 14.

Thus, the degree of correlation is calculated on the basis of line-of-sight information about a direction along which viewers are likely to largely move their lines of sight, so that the degree of correlation can be calculated with high accuracy.

The line-of-sight information includes rotation information about the pupils of viewers.

Thus, even if the coordinates of the focus point of a viewer cannot be detected on the shared screen 31, the information processing device 2 can determine whether to display line-of-sight guidance.

The line-of-sight information includes multiple information items about the lines of sight of viewers, and the correlation degree calculation unit 25 calculates a degree of correlation by assigning weights to the multiple information items included in the line-of-sight information.

Thus, the information processing device 2 can accurately calculate a degree of correlation by using the multiple information items.

The display control unit 21 is provided to display line-of-sight guidance when it is determined that line-of-sight guidance is to be displayed.

Thus, the information processing devices 2 can guide the lines of sight of viewers to a region indicated by the presenter.

The display control unit 21 displays, as line-of-sight guidance display, a blurred region outside of a predetermined range with respect to the focus point of the presenter on the shared screen 31.

Thus, the information processing devices 2 can guide the lines of sight of viewers to a clear region.

The display control unit 21 displays, as line-of-sight guidance display, the marker 55 with respect to the focus point of the presenter on the shared screen 31.

Thus, the information processing devices 2 can guide the lines of sight of viewers to a region inside of the marker 55.

The display control unit 21 displays, as line guidance display, a moving icon (pointer 33) with respect to the focus point of the presenter on the shared screen 31.

Thus, the information processing devices 2 can guide the lines of sight of viewers to the vicinity of the icon moving as guidance display.

The display control unit 21 displays, as line-of-sight guidance display, line-of-sight guidance animation from the focus point of a viewer to the focus point of the presenter on the shared screen 31.

Thus, the information processing devices 2 can move the lines of sight of viewers from the current focus point to a region indicated by the presenter.

The line-of-sight guidance display determination unit 26 switches whether or not to display line-of-sight guidance in response to an instruction of the presenter.

Thus, if the presenter does not intend to move the lines of sight of viewers to a predetermined region, the information processing devices 2 can determine that line-of-sight guidance is not to be displayed.

Moreover, the line-of-sight guidance display determination unit 26 determines that line-of-sight guidance is not to be displayed for a predetermined period after the shared screen 31 is switched.

Thus, when viewers look at the overall shared screen 31 immediately after the shared screen 31 is switched, the information processing devices 2 can skip line-of-sight guidance display.

When the display unit 14 displays the shared screen 31 on which the focus points of viewers concentrate at a certain point, the line-of-sight guidance display determination unit 26 determines that line-of-sight guidance is not to be displayed.

Thus, the information processing devices 2 can skip line-of-sight guidance display when viewers can easily recognize a focus point.

An information processing device according to claim 1.

As described above, an information processing method of the embodiment causes the information processing device 2 to acquire line-of-sight information about viewers on the shared screen 31 displayed on the display unit 14, and determine whether to display line-of-sight guidance for guiding the lines of sight of the viewers, on the basis of the line-of-sight information about the viewers.

As described above, a program of the embodiment causes the information processing device 2 to perform processing for acquiring line-of-sight information about viewers on the shared screen 31 displayed on the display unit 14, and determining whether to display line-of-sight guidance for guiding the lines of sight of the viewers, on the basis of the line-of-sight information about the viewers.

The program can be recorded in advance in an HDD serving as a recording medium embedded in a device such as a computer device or a ROM or the like in a microcomputer that includes a CPU.

Alternatively, the program can be stored (recorded) temporarily or perpetually on a removable recording medium such as a flexible disc, a compact disc read-only memory (CD-ROM), a magneto optical (MO) disc, a digital versatile disc (DVD), a Blu-ray Disc (registered trademark), a magnetic disk, a semiconductor memory, or a memory card. The removable recording medium can be provided as so-called package software.

The program can be installed from the removable recording medium to a personal computer or the like and can also be downloaded from a download site via a network such as a local area network (LAN) or the Internet.

Note that the advantageous effects described in the present specification are merely exemplary and are not limited, and other advantageous effects may be obtained.

9. Present Technique

The present technique can also be configured as follows:

(1) An information processing device including:

a line-of-sight information acquisition unit that acquires line-of-sight information about viewers on a shared screen displayed on a display unit; and a line-of-sight guidance display determination unit that determines whether to display line-of-sight guidance for guiding the lines of sight of the viewers, on the basis of the line-of-sight information about the viewers.

(2)

The information processing device according to (1), further including an operation information acquisition unit that acquires operation information about a pointing operation performed on the shared screen by a presenter, wherein the line-of-sight guidance display determination unit determines whether to display the line-of-sight guidance when the pointing operation is not performed.

(3)

The information processing device according to (1) or (2), further including a correlation degree calculation unit that calculates the degree of correlation of the line-of-sight information between the viewers, wherein the line-of-sight guidance display determination unit determines whether to display the line-of-sight guidance on the basis of the degree of correlation.

(4)

The information processing device according to (3), wherein the correlation degree calculation unit calculates the correlation value of the line-of-sight information between the viewers, and the line-of-sight guidance display determination unit determines whether to display the line-of-sight guidance on the basis of the correlation value.

(5)

The information processing device according to (3) or (4), wherein the correlation degree calculation unit calculates the degree of dispersion of the line-of-sight information about the viewers, and the line-of-sight guidance display determination unit determines whether to display the line-of-sight guidance on the basis of the degree of dispersion.

(6)

The information processing device according to any one of (3) to (5), wherein the line-of-sight information includes the coordinates of the focus points of the viewers on the shared screen.

(7)

The information processing device according to (6), wherein the line-of-sight information includes multiple information items about the lines of sight of the viewers, and the correlation degree calculation unit calculates the degree of correlation on the basis of information corresponding to the orientation of characters displayed on the shared screen.

(8)

The information processing device according to (6) or (7), wherein the line-of-sight information includes multiple information items about the lines of sight of the viewers, and the correlation degree calculation unit calculates the degree of correlation on the basis of information corresponding to the aspect ratio of the display unit.

(9)

The information processing device according to any one of (1) to (8), wherein the line-of-sight information includes rotation information about the pupils of the viewers.

(10)

The information processing device according to any one of (3) to (8), wherein the line-of-sight information includes multiple information items about the lines of sight of the viewers, and the correlation degree calculation unit calculates the degree of correlation by assigning weights to the multiple information items included in the line-of-sight information.

(11)

The information processing device according to any one of (1) to (10), further including a display control unit that displays the line-of-sight guidance when it is determined that the line-of-sight guidance is to be displayed.

(12)

The information processing device according to (11), wherein the display control unit displays, as the line-of-sight guidance display, a blurred region outside of a predetermined range with respect to the focus point of the presenter on the shared screen.

(13)

The information processing device according to (11) or (12), wherein the display control unit displays, as the line-of-sight guidance display, a marker with respect to the focus point of the presenter on the shared screen.

(14)

The information processing device according to any one of (11) to (13), wherein the display control unit displays, as the line-of-sight guidance display, a moving icon with respect to the focus point of the presenter on the shared screen.

(15)

The information processing device according to any one of (11) to (14), wherein the display control unit displays, as the line-of-sight guidance display, line-of-sight guidance animation from the focus point of the viewer to the focus point of the presenter on the shared screen.

(16)

The information processing device according to any one of (1) to (15), wherein the line-of-sight guidance display determination unit switches whether or not to display the line-of-sight guidance in response to an instruction of the presenter.

(17)

The information processing device according to any one of (1) to (16), wherein the line-of-sight guidance display determination unit determines that the line-of-sight guidance is not to be displayed for a predetermined period after the shared screen is switched.

(18)

The information processing device according to any one of (1) to (17), wherein when the display unit displays the shared screen on which the focus points of the viewers concentrate at a certain point, the line-of-sight guidance display determination unit determines that the line-of-sight guidance is not to be displayed.

(19)

An information processing method that causes an information processing device to:

acquire line-of-sight information about viewers on a shared screen displayed on a display unit; and determine whether to display line of sight guidance for guiding the lines of sight of the viewers, on the basis of the line of sight information about the viewers.

(20) A program that causes an information processing device to perform processing including:

acquiring line-of-sight information about viewers on a shared screen displayed on a display unit; and determining whether to display line of sight guidance for guiding the lines of sight of the viewers, on the basis of the line-of-sight information about the viewers.

REFERENCE SIGNS LIST

1 Online communication system
2 Information processing device
10 CPU
21 Display control unit
22 Presenter detection unit
23 Operation information acquisition unit
24 Line-of-sight information acquisition unit
25 Correlation degree calculation unit
26 Line-of-sight guidance determination unit

The invention claimed is:

1. An information processing method comprising:

receiving line-of-sight information about a plurality of viewers on a shared screen displayed on a display device;

calculating a degree of correlation of the line-of-sight information between the plurality of viewers based on a degree of dispersion of the line-of-sight information about the plurality of viewers; and determining whether to display line-of-sight guidance for guiding lines of sight of the plurality of viewers, based on the line-of-sight information about the plurality of viewers, wherein the line-of-sight information includes multiple information items about the lines of sight of the plurality of viewers, and wherein it is determined whether to display the line-of-sight guidance based on the degree of correlation of the multiple information items about the lines of sight of the plurality of viewers calculated based on the degree of dispersion.

2. The information processing method according to claim 1, wherein the method further comprises receiving operation information about a pointing operation performed on the shared screen by a presenter, and wherein it is determined to display the line-of-sight guidance when the pointing operation is not performed.

3. The information processing method according to claim 1, wherein the method further comprises calculating a correlation value of the line-of-sight information between the plurality of viewers, and wherein it is determined whether to display the line-of-sight guidance further based on the correlation value.

4. The information processing method according to claim 1, wherein the line-of-sight information includes coordinates of focus points of the plurality of viewers on the shared screen.

5. The information processing method according to claim 4, wherein the degree of correlation is calculated further based on information corresponding to orientation of characters displayed on the shared screen.

6. The information processing method according to claim 4, wherein the degree of correlation is calculated further based on information corresponding to an aspect ratio of the display device.

7. The information processing method according to claim 1,
    wherein the line-of-sight information includes rotation information about pupils of the plurality of viewers.

8. The information processing method according to claim 1,
    wherein the degree of correlation is calculated by assigning weights to the multiple information items included in the line-of-sight information.

9. The information processing method according to claim 1,
    wherein the method further comprises controlling display of the line-of-sight guidance when it is determined that the line-of-sight guidance is to be displayed.

10. The information processing method according to claim 9,
    wherein the display device is controlled to display, as the line-of-sight guidance display, a blurred region outside of a predetermined range with respect to a focus point of a presenter on the shared screen.

11. The information processing method according to claim 9,
    wherein the display device is controlled to display, as the line-of-sight guidance display, a marker with respect to a focus point of a presenter on the shared screen.

12. The information processing method according to claim 9,
    wherein the display device is controlled to display, as the line-of-sight guidance display, a moving icon with respect to a focus point of a presenter on the shared screen.

13. The information processing method according to claim 9,
    wherein the display device is controlled to display, as the line-of-sight guidance display, line-of-sight guidance animation from a focus point of at least one viewer of the plurality of viewers viewer to a focus point of a presenter on the shared screen.

14. The information processing method according to claim 1,
    wherein the method further comprises switching whether or not to display the line-of-sight guidance in response to an instruction of a presenter.

15. The information processing method according to claim 1,
    wherein the method further comprises determining that the line-of-sight guidance is not to be displayed for a predetermined period after the shared screen is switched.

16. The information processing method according to claim 1,
    wherein when the display device displays the shared screen on which focus points of the plurality of viewers concentrate at a certain point, it is determined that the line-of-sight guidance is not to be displayed.

17. An information processing device comprising:
    circuitry configured to
        receive line-of-sight information about viewers on a shared screen displayed on a display device,
        calculate a degree of correlation of the line-of-sight information between the plurality of viewers based on a degree of dispersion of the line-of-sight information about the plurality of viewers, and
        determine whether to display line-of-sight guidance for guiding lines of sight of the plurality of viewers, based on the line-of-sight information about the plurality of viewers, wherein the line-of-sight information includes multiple information items about the lines of sight of the plurality of viewers, and
        wherein the circuitry determines whether to display the line-of-sight guidance based on the degree of correlation of the multiple information items about the lines of sight of the plurality of viewers calculated based on the degree of dispersion.

18. A non-transitory computer-readable storage medium having embodied thereon a program, which when executed by that causes an information processing device of a computer causes the computer to execute a method, the method comprising:
    receiving line-of-sight information about viewers on a shared screen displayed on a display device;
    calculating a degree of correlation of the line-of-sight information between the plurality of viewers based on a degree of dispersion of the line-of-sight information about the plurality of viewers; and
    determining whether to display line-of-sight guidance for guiding lines of sight of the plurality of viewers, based on the line-of-sight information about the plurality of viewers,
    wherein the line-of-sight information includes multiple information items about the lines of sight of the plurality of viewers, and
    wherein it is determined whether to display the line-of-sight guidance based on the degree of correlation of the multiple information items about the lines of sight of the plurality of viewers calculated based on the degree of dispersion.

19. An information processing method comprising:
    receiving line-of-sight information about a plurality of viewers on a shared screen displayed on a display device;
    calculating a degree of correlation of the line-of-sight information between the plurality of viewers; and
    determining whether to display line-of-sight guidance for guiding lines of sight of the plurality of viewers, based on the line-of-sight information about the plurality of viewers;
    wherein the line-of-sight information includes coordinates of focus points of the plurality of viewers on the shared screen and includes multiple information items about the lines of sight of the plurality of viewers,
    wherein the degree of correlation is calculated based on information corresponding to an aspect ratio of the display device, and
    wherein it is determined whether to display the line-of-sight guidance based on the degree of correlation of the multiple information items about the lines of sight of the plurality of viewers calculated based on the aspect ratio of the display device.

20. An information processing method comprising:
    receiving line-of-sight information about a plurality of viewers on a shared screen displayed on a display device;
    calculating a degree of correlation of the line-of-sight information between the plurality of viewers; and
    determining whether to display line-of-sight guidance for guiding lines of sight of the plurality of viewers, based on the line-of-sight information about the plurality of viewers;
    wherein the line-of-sight information includes multiple information items about the lines of sight of the plurality of viewers, wherein the degree of correlation is calculated by assigning weights to the multiple information items included in the line-of-sight information, and wherein it is determined whether to display the line-of-sight guidance based on the degree of correlation of the multiple information items about the lines of sight of the plurality of viewers calculated by assigning the weights to the multiple information items included in the line-of-sight information.

21. An information processing method comprising:

receiving line-of-sight information about a plurality of viewers on a shared screen displayed on a display device;

determining whether to display line-of-sight guidance for guiding lines of sight of the plurality of viewers, based on the line-of-sight information about the plurality of viewers; and controlling display of the line-of-sight guidance when it is determined that the line-of-sight guidance is to be displayed, wherein the display device is controlled to display, as the line-of-sight guidance display, line-of-sight guidance animation from a focus point of at least one viewer of the plurality of viewers to a focus point of a presenter on the shared screen.

\* \* \* \* \*